United States Patent [19]

Gabriel et al.

[11] E Re. 31,277

[45] Reissued Jun. 14, 1983

[54] TELEPHONE CABLE WITH IMPROVED SHIELD COMBINATION

[75] Inventors: Anthony P. Gabriel, Staten Island, N.Y.; Jimmy Justiss, Bonham, Tex.

[73] Assignee: General Cable Corporation

[21] Appl. No.: 295,126

[22] Filed: Aug. 21, 1981

Related U.S. Patent Documents

Reissue of:

[64] Patent No.: 4,165,442
Issued: Aug. 21, 1979
Appl. No.: 914,505
Filed: Jun. 12, 1978

[51] Int. Cl.[3] ..... H01B 11/06

[52] U.S. Cl. ..... 174/36; 174/105 B; 174/107

[58] Field of Search ..... 174/36, 105 B, 105 R, 174/103, 106 R, 113 R, 112

[56] References Cited

U.S. PATENT DOCUMENTS

| | | | |
|---|---|---|---|
| 2,585,054 | 2/1952 | Stachura | 174/36 |
| 3,422,214 | 1/1969 | Kelly | 174/103 |
| 3,622,683 | 11/1971 | Roberts | 174/36 |
| 3,803,340 | 4/1974 | Jachinowicz | 174/36 |
| 3,881,052 | 4/1975 | Britz | 174/103 |
| 4,085,284 | 4/1978 | Olszewski | 174/36 |

FOREIGN PATENT DOCUMENTS

| | | | |
|---|---|---|---|
| 132526 | 5/1949 | Australia | 174/103 |

*Primary Examiner*—Richard R. Kucia

[57] ABSTRACT

Communication cables with cores that have groups of conductor pairs, that carry messages in opposite directions, in the same cable present the problem of crosstalk between the different groups. With the increase in carrier frequency that is used for communication, the crosstalk problem increases, and cables that were acceptable for lower frequency are no longer adequate. This invention provides more efficient shielding; is suitable for higher frequencies; provides a stronger cable structure; and reduces corrosion of the shielding.

23 Claims, 6 Drawing Figures

TELEPHONE CABLE WITH IMPROVED SHIELD COMBINATION

Matter enclosed in heavy brackets [ ] appears in the original patent but forms no part of this reissue specification; matter printed in italics indicates the additions made by reissue.

RELATED PATENTS

Pertinent prior art is disclosed in U.S. Pat. No. 3,803,340, issued Apr. 9, 1974; and in pending patent application Ser. No. 713,228, filed Aug. 10, 1976, U.S. Pat. No. 4,085,284.

BACKGROUND AND SUMMARY OF THE INVENTION

The necessity of internally screened telephone cables has been adequately described in U.S. Pat. No. 3,803,340 which was awarded to General Cable Corporation on Apr. 9, 1974. The construction disclosed in the patent met established telephone industry standards for 24-channel PCM carrier transmission at 772 kHz; and the near end crosstalk isolation margins were better than those of screened cables of other telephone cable manufacturers at that time.

With the passage of time, however, technology advanced such that the original screened cables no longer provided an adequate margin of performance for expanded capacity PCM systems. In addition, economic considerations became of prime concern. Both low cost and high performance had to go hand in hand. Furthermore, as time progressed, certain weaknesses in the original designs became evident. An enumeration of such deficiencies, whether due to advancements of the art, the concerns of cost or just inadequacies of the original design include:

(a) The established practice of many telephone operating companies of electrically "floating" (not grounding) the screen while grounding the overall shield. This placed a heavy demand upon the screen shielding efficiency.

(b) The foregoing situation also imposed severe voltage withstand requirements on the screen insulant layers. Because of this condition, certain manufacturers of telephone cable imposed the requirement that these insulant layers had to withstand a 10 kV-DC potential level.

(c) With the continued expansion of channel capacity, and the corresponding increased frequency bandwidth, increased shielding efficiency was required of the screening component. At a Nyquist frequency of 1.576 MHz, for example the original "D" screen design (referenced patent) offered but marginal compliance. In this case compliance refers to the tentative industrial standard of 80 db worst case Power Sum Near End Crosstalk.

(d) The complexity of the presently employed screening tapes, and the associated high costs, have significantly increased the attractiveness of the prior art screened cable system with respect to two cable operation.

(e) The use of shields and/or screens of the prior art which rely on overlap seams which occur on or about the shield circumference tend to impair the mechanical strength of the composite cable, and in addition have a noticeable effect upon shield life because of the effects of corrosion.

The invention of this specification overcomes these problems by changes in the screens that shield the groups of conductors from one another and from the outside with more efficient screening and obtain acceptable limits of near end crosstalk. At the same time, the changes in the shielding screens obtain structurally stronger communication cables and protect uncoated edges of aluminum screening tapes from corrosion, thereby increasing the useful life of the cable.

Revisions in the geometry of the shielding screens also protect the conductors in the cable from water which enters the cable through breaks or imperfections in the outside jacket of the cable.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
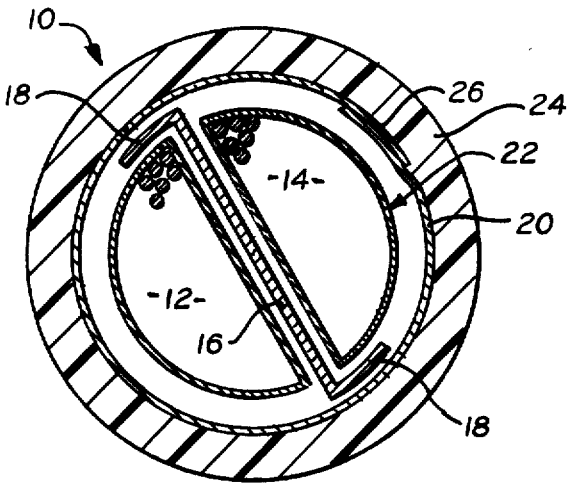
FIG. 1. PRIOR ART
FIGS. 1 and 2 show two different constructions used by the prior art for preventing near end crosstalk in communication cables.

FIG. 1 shows one example of the prior art on which the present invention is an improvement. A communication cable 10 has a group of conductors 12 comprising one-half of the cable core; and another group of conductors 14 comprising the other half of the cable core. The cables in group 12 carry messages in one direction and the cables in group 14 carry messages in the other direction. The problem with having both groups close to one another and constituting part of the same cable is that proximity effects between the two groups result in interference which is commonly referred to in the communication business as crosstalk.

To prevent this interference, cables were made with inner shields or screens 16 which extend between the two halves 12 and 14 of the cable core, and this reduces the flux leakage which results in crosstalk. Even better results are obtained if the inner shield or screen 16 is made wide enough so that end portions 18 can be bent to a circumferential shape which extends part way around the outside of the conductor groups 12 and 14, respectively.

An outer shield 20 surrounds the core 22 which comprises the groups of conductors 12 and 14 also surrounds the inner shield or screen 16 and its circumferentially extending end portions 18. A jacket 24 is applied over the shield 20, and the shield 20 is shown with a longitudinal lap seam 26.

Figure 5:
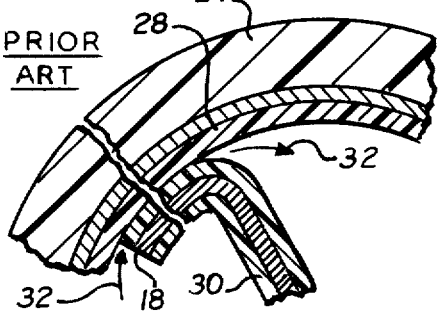
FIG. 5. PRIOR ART
FIG. 5 is a diagrammatic view showing the flux leakage area for a cable of the type shown in FIG. 1.

If the shield 20 is made of aluminum, FIG. 5 shows it coated with plastic coating 28, such as adhesive polyethylene to prevent corrosion of the aluminum. The inner shield 16, if made of aluminum or other corrosive metal, is also coated, on both sides, with plastic corrosion-protecting coating designated in FIG. 5, by the reference character 30.

In the construction illustrated in FIG. 5, the plastic coating 28 on the outer shield 20 contacts with the plastic coating on the circumferential portions of the inner schreen 16 and these coatings may be bonded to one another.

The metal of the inner shield 16, and its circumferential portions 18, prevent the direct flow of flux between the opposite halves 12 and 14 of the core 22. However, the plastic coating on the metal does not prevent the flow of flux and thus flux from the conductor group 12 travels circumferentially under the circumferential portion 18 of the inner shield 16 and around the edge of this portion 18 and through the plastic coatings on the inner and outer shields 18 and 20 into the compartment containing the conductor group 14, this flow of flux being indicated in FIG. 5 by the arrows 32. The same flow of flux occurs at the other end of the inner shield or screen 16, and there are even shorter paths for flux flow from the chambers containing the conductor groups 12 and 14 directly from the corners of the portions 18 circumferentially across the outer surfaces of these inner shield portions 18, the flux being free to flow in both directions between the cable compartments containing the conductors 12 and 14 and the flux paths being quite short. In cables which carry currents that produce a strong flux, the shielding shown in FIG. 1 is unsatisfactory.

Figure 2:
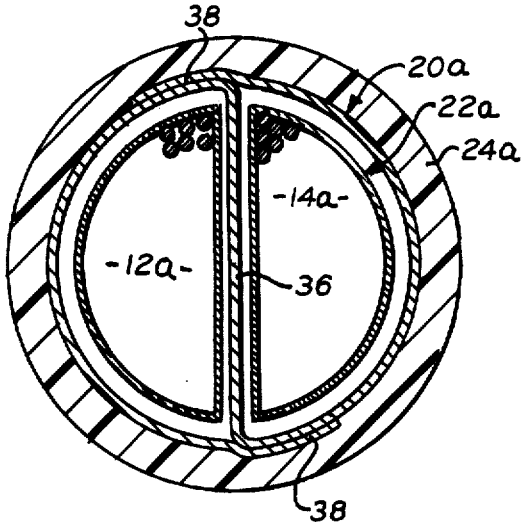
FIG. 2. PRIOR ART

FIG. 2 shows an improved construction, which has been used in the prior art. The opposite halves of the core 22a are indicated by the reference characters 12a and 14a. A single shield 20a is covered by a jacket 24a, and the shield 20a extends around the entire circumference of the core 22a and has a diametral portion 36 which corresponds to the shield 16 of FIG. 1. This diametral shield 36 is preferably of one-piece construction with the shield 20a, and this construction is obtained by bending the outer radial limits of the diametral shield 36 in opposite directions to form the circumferential portions of the shield 20a. These circumferential portions have their ends which are remote from their connection with the diametral portion 36 extending over a part of the length of the respective circumferential portions and in contact therewith at the lap seams 38.

The shield 20a may be coated with plastic in the same way as the inner shield 16 of FIGS. 1 and 5, and as in FIG. 1, but the coating is not shown in FIG. 2 in order to simplify the drawing. When there is plastic coating within the lap seam 38, flux can leak through between the metal faces at the lap seams 38, and any flux that escapes from the portion of cable core 14a at the upper seam 38 can travel through the plastic coating on the outside of the shield 20a and get into the chamber containing the other conductors in group 12a through the plastic coating at the lower lap seam 38. Similarly, flux escaping from the core half 12a between the metal parts of the lower lap seam 38 can escape into the compartment containing the other conductors 14a at the upper seam 38.

Figure 3:
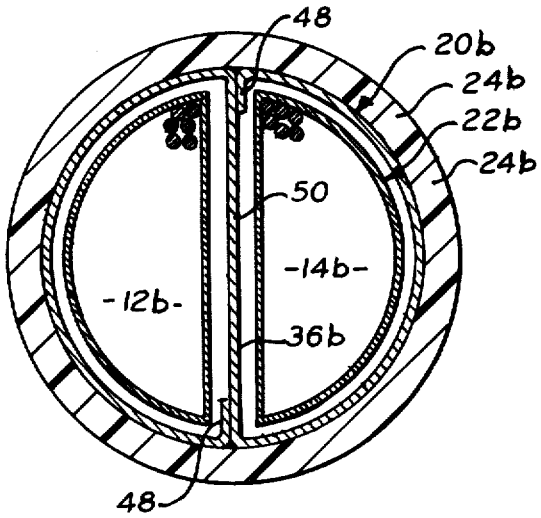
FIG. 3 is a transverse cross-section, similar to FIGS. 1 and 2, but showing the improved screen construction of this specification.

The construction shown in FIG. 2 attenuates the leakage flux by increasing the length of the leakage path, but the thin metal partition 36 does not entirely eliminate flux permeation through it, though the construction of FIG. 2 is suitable for circuits where the FIG. 1 construction would be entirely unsatisfactory. FIG. 3 shows a construction similar to FIG. 2, and with corresponding parts indicated by the same reference character with a "b" appended where a letter "a" is used in FIG. 2. FIG. 3 differs from FIG. 2 in that the ends of the metal shield 20b are bent radially inward at edge portions 48 which confront the upper and lower portions of a diametral center partition 50 of the shield 20b, and which corresponds to the diametral portion 36 in FIG. 2.

Figure 6:
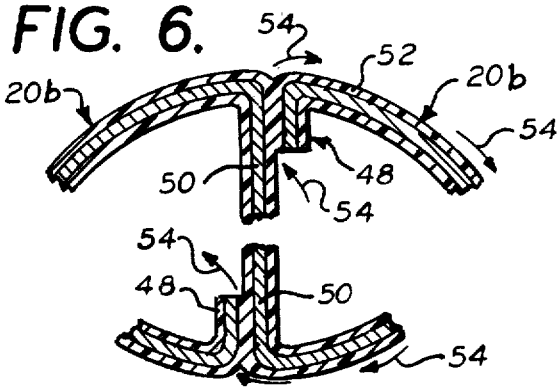
FIG. 6 is a fragmentary diagrammatic view showing the flux leakage area for a communication cable of the type shown in FIG. 3.

The metal shield 20b is preferably coated with a corrosion-protective coating 52, as shown in FIG. 6, which is a fragmentary view of the upper and lower portions of the diametral partition 50 and adjacent structure of the screen 20b.

There are flux leakage paths in the shield configuration of FIG. 3, as shown in the larger scale view of FIG. 6 where the plastic coating 52 is shown in section. From the compartment which encloses the groups of conductors 14 (FIG. 3), flux can travel through the plastic coating 52 in the directions indicated by the arrows 54. The flux path travels through the plastic coating 52 which bonds the edge portion 58 to the top part of the diametral partition 50 and then travels circumferentially and clockwise through the coating 52 on the outside of the shield 20b to the bottom of the partition 50 and then through the plastic between the lower portion of the partition 50 and the lower edge portion 48 of the shield 20b. It will be apparent that flux from the conductors on the left-hand side of the partition 50 can flow along the same flux path to the conductors on the right-hand side of the partition 50.

While the flux leakage is substantially the same in the conductors shown in FIGS. 2 and 3, the construction of FIG. 3 is substantially stronger mechanically than that of FIG. 2. By bending the edge portions 48 of FIG. 3 at right angles to the circumference of the shield 20b, two right-angle bends of the shield are obtained at both the upper and lower ends of partition 50. In FIG. 2, there is only one right-angle bend at the upper and lower end of the partition 36.

Figure 4:
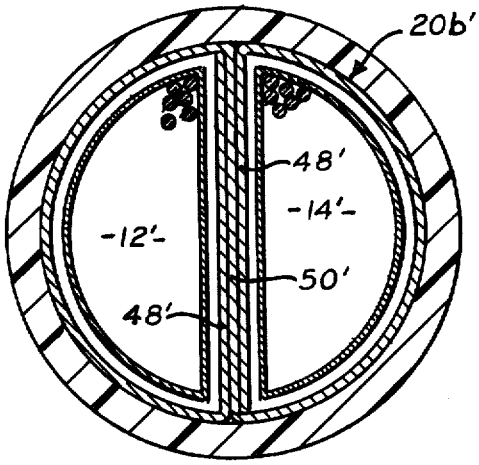
FIG. 4 is a view similar to FIG. 3 but showing a modified construction in which the inwardly-bent edges of the screen extend for the full height of the middle partition.

FIG. 4 shows the preferred embodiment of the present invention which differs from FIG. 3, in that the edge portions 48 of the screen 20b are extended as far as possible along the opposite sides of the center partition 50'. These extended edge portions are indicated in FIG. 4 by the reference characters 48', and other parts which correspond to the structure of FIG. 3 are indicated by the same reference characters as in FIG. 3 but with a prime appended. The flux leakage paths in FIG. 4 are much longer than in FIG. 3, because of the additional length of the edge portions 48'.

When metal strips which do not have their edges coated with plastic are used for the strip 20b', in the construction shown in FIG. 4, and the uncoated edges at the top and bottom of the edge portions 48 contact with the coating on the inside of the shield 20b', there are constrictions in the flux leakage paths where the flux can leak only through one thickness of coating in order to gain access to the coating on the confronting faces of the partition 50' and the extended edge portions 48'. FIG. 4 has an additional advantage for reducing or eliminating crosstalk between the groups of conductors 12' and 14'. The three layers of metal 50' and 48' on both sides of the partition 50' increase the thickness of metal between the groups of conductors with corresponding reduction in flux permeation between the compartments on opposite sides of the center partition 50'. The substantially greater length of the flux leakage path between the compartments of the conductors 12 and 14 also reduces substantially the amount of flux that leaks from one compartment to the other.

The preferred embodiment of the invention has been illustrated and described, but changes and modifications can be made and some features can be used in different combinations without departing from the invention as defined in the claims.

What is claimed is:

1. A communication cable including a core containing a plurality of conductors divided into groups along a generally diametral plane through the core, a metal screen, that is a conductor of electricity, having a middle panel that extends between said different groups at said diametral plane, the middle panel of the metal screen being bent in opposite circumferential directions at the opposite ends thereof and curving around the circumferential portions of the different groups of conductors and extending circumferentially around one-half of the circumference of the core to form a portion of the screen that is of semi-circular cross-section, and each of the portions of the screen that is of semi-circular cross-section having end portions, remote from its connection to the middle panel of the screen, said end portions being bent inward substantially parallel to the middle panel of the screen, and a layer of dielectric material on one side of the screen.

2. The communication cable described in claim 1 characterized by the inwardly bent edge portions of the semi-circular portions of the screen being connected to the middle panel of the screen to increase the strength of the cable.

3. The communication cable described in claim 1 characterized by the screen being a unitary metal tape with a dielectric material comprising a corrosion-protection coating on the outside surface of the metal tape, and the coating being made of thermo-plastic material that is fused to form an integral structure with the inwardly-bent end portions that confront the surfaces of the middle panel of the screen where they confront said middle panel.

4. The communication cable described in claim 3 characterized by the tape being an aluminum strip of good electrical conductivity, and the corrosion-protecting coating being polyethylene combined with material to increase the adherence of the polyethylene to the aluminum.

5. The communication cable described in claim 1 characterized by the inwardly-bend end portions of the screen each extending for more than one-half of the height of the middle panel so that there is a two-layer thickness of screen between the groups of conductors.

6. The communication cable described in claim 1 characterized by the inwardly-bent portions of the screen each extending for substantially the full height of the middle panel so that there are three layers of thickness of the screen between the groups of conductors.

7. The communication cable described in claim 5 characterized by layers of metallic material, separated by layers of dielectric material between the groups of conductors for effecting attenuation, as the result of reflections of leakage currents through the screen between the groups of conductors.

8. The communication cable described in claim 1 characterized by the screen being made of metal that eventually corrodes when it contacts with water, an outer jacket surrounding the screen for protecting the screen from mechanical damage and from access of water to the screen, the dielectric layer being a waterproof plastic coating of material adhered to the outside surface of the screen with the edges of the screen being bare, and the inwardly-bent portion of the screen projecting inwardly away from the outer jacket so that the bare, uncoated edges of the screen are remote from the outer jacket and out of reach of water that gains access to the outside of the screen through a break in the outer jacket.

9. The communication cable described in claim 8 characterized by insulated conductors in the groups of conductors, the outer jacket being an extrudate applied directly to the cable screen, the screen being a tape with the dielectric layer a plastic coating on the outside surface of the tape, the dielectric layer in the inwardly-bent end portions confronting a corresponding area on the middle panel and being fused thereto, the fusion temperature of the dielectric coating being low enough for the plastic of the coating to be fused by the heat of extrusion of the outer jacket over the screen and the temperature of the fusion being low enough so as not to damage the plastic insulation on the conductors within the groups of conductors.

10. The communication cable described in claim 9 characterized by each group of conductors being held in assembled relation by the portions of the screen that separate the groups from one another and by the portions of the screen that extend around the circumferential extent of the respective groups of conductors.

11. The communication cable described in claim 1 characterized by the screen being made of metal that eventually corrodes when in contact with water, the dielectric layer being a waterproof plastic coating of material adhered to the outside surface of the screen with the edges of the screen bare, and the inwardly-bent end portions of the screen projecting inward away from the circumference of the cable, filling material within the cable and consisting of material that is applied hot and at a temperature that fuses the dielectric so that the dielectric material on the inwardly-bent end portions fuses to the dielectric material on the surfaces of the middle panel that confronts said end portions to seal the screen against access of water to the edges of the inwardly-bent edge portions.

12. The communication cable described in claim 1 characterized by the middle panel dividing the core of the cable into different compartments for containing the groups of conductors, and each of the inwardly-bent end portions of the screen extending into one of said compartments.

*13. A communication cable including a core containing a plurality of conductors divided into groups along a generally dimetral plane through the core, a metal screen, that is a conductor of electricity, having a middle panel that extends between said different groups at said diametral plane, the middle panel of the metal screen being bent in opposite circumferential directions at the opposite ends thereof and curving around the circumferential portions of the different groups of conductors and extending circumferentially around one-half of the circumference of the core to form a portion of the screen that is of semi-circular cross-section, and each of the portions of the screen that is of semi-circular cross-section having end portions, remote from its connection to the middle panel of the screen, said*

*end portions being bent inward substantially parallel to the middle panel of the screen.*

*14. The communication cable of claim 13 characterized by the inwardly bent edge portions of the semi-circular portions of the screen being connected to the middle panel of the screen to increase the strength of the cable.*

*15. The communication cable of claim 14 which further comprises a layer of dielectric material on each side of the screen.*

*16. The communication cable of claim 15 characterized by the screen being a unitary metal tape and the dielectric material comprising a corrosion-protection coating on the metal tape, and the coating being made of thermo-plastic material that is fused to form an integral structure with the inwardly-bent end portions that confront the surfaces of the middle panel of the screen where they confront said middle panel.*

*17. The communication cable of claim 16 characterized by the tape being an aluminum strip of good electrical conductivity, and the corrosion-protecting coating being polyethylene combined with material to increase the adherence of the polyethylene to the aluminum.*

*18. The communication cable of claims 13 or 15 characterized by the inwardly-bent end portions of the screen each extending for more than one-half of the height of the middle panel so that there is a two-layer thickness of screen between the groups of conductors.*

*19. The communication cable of claims 13 or 15 characterized by the inwardly-bent portions of the screen each extending for substantially the full height of the middle panel so that there are three layers of thickness of the screen between the groups of conductors.*

*20. The communication cable of claim 13 characterized by the screen being made of metal that eventually corrodes when it contacts with water, an outer jacket surrounding the screen for protecting the screen from mechanical damage and from access of water to the screen and the inwardly-bent portion of the screen projecting inwardly away from the outer jacket so that the bare, uncoated edges of the screen projecting inwardly away from the outer jacket so that the bare, uncoated edges of the screen are remote from the outer jacket and out of reach of water that gains access to the outside of the screen through a break in the outer jacket.*

*21. The communication cable of claim 15 characterized by the screen being made of metal that eventually corrodes when it contacts with water, an outer jacket surrounding the screen for protecting the screen from mechanical damage and from access of water to the screen, the dielectric layer being a water-proof plastic coating of material adhered to the outside surface of the screen with the edges of the screen being bare, and the inwardly-bent portion of the screen projecting inwardly away from the outer jacket so that the bare, uncoated edges of the screen are remote from the outer jacket and out of reach of water that gains access to the outside of the screen through a break in the outer jacket.*

*22. The communication cable of claim 15 characterized by the screen being made of metal that eventually corrodes when in contact with water, the dielectric layer being a waterproof plastic coating of material adhered to the outside surface of the screen with the edges of the screen bare, and the inwardly-bent end portions of the screen projecting inward away from the circumference of the cable, filling material within the cable and consisting of material that is applied hot and at a temperature that fuses the dielectric so that the dielectric material on the inwardly-bent end portions fuses to the dielectric material on the surfaces of the middle panel that confronts said end portions to seal the screen against access of water to the edges of the inwardly-bent edge portions.*

*23. The communication cable of claims 13 or 15 characterized by the middle panel dividing the core of the cable into different compartments for containing the groups of conductors, and each of the inwardly-bent end portions of the screen extending into one of said compartments.*

* * * * *